(12) United States Patent
Bush et al.

(10) Patent No.: US 8,798,803 B2
(45) Date of Patent: Aug. 5, 2014

(54) CONTROL SYSTEM FOR AN ELECTRIC POWER SYSTEM

(75) Inventors: Stephen Francis Bush, Latham, NY (US); Michael Joseph Mahony, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 452 days.

(21) Appl. No.: 13/170,878

(22) Filed: Jun. 28, 2011

(65) Prior Publication Data

US 2013/0006434 A1    Jan. 3, 2013

(51) Int. Cl.
*G06F 19/00*    (2011.01)
*H02J 7/00*    (2006.01)

(52) U.S. Cl.
CPC ............... *H02J 7/0027* (2013.01); *Y02T 90/14* (2013.01)
USPC ............ 700/293; 701/423; 701/429; 320/109

(58) Field of Classification Search
CPC ..... Y04S 10/126; Y02T 90/14; Y02T 90/128; Y02T 90/16; Y02T 10/7044; H02J 7/0027
USPC .................... 700/293; 701/423, 429; 320/109
See application file for complete search history.

(56) References Cited

U.S. PATENT DOCUMENTS

| | | | |
|---|---|---|---|
| 6,225,776 B1 | 5/2001 | Chai | |
| 7,627,453 B2 * | 12/2009 | Keefe et al. | 702/182 |
| 7,773,360 B2 | 8/2010 | O'Leary et al. | |
| 2004/0130292 A1 | 7/2004 | Buchanan et al. | |
| 2010/0017249 A1 * | 1/2010 | Fincham et al. | 705/8 |
| 2010/0134067 A1 * | 6/2010 | Baxter et al. | 320/109 |
| 2010/0191585 A1 * | 7/2010 | Smith | 705/13 |
| 2011/0133693 A1 * | 6/2011 | Lowenthal et al. | 320/109 |
| 2011/0213656 A1 * | 9/2011 | Turner | 705/14.49 |
| 2011/0215758 A1 * | 9/2011 | Stahlin et al. | 320/109 |
| 2011/0246252 A1 * | 10/2011 | Uesugi | 705/7.12 |
| 2012/0105001 A1 * | 5/2012 | Gallegos et al. | 320/109 |
| 2012/0109515 A1 * | 5/2012 | Uyeki et al. | 701/423 |
| 2012/0109519 A1 * | 5/2012 | Uyeki | 701/439 |
| 2013/0221919 A1 * | 8/2013 | Gallegos et al. | 320/109 |

FOREIGN PATENT DOCUMENTS

EP    0762590 A1    3/1997

OTHER PUBLICATIONS

Search Report from corresponding GB Application No. GB1211287.6 dated Oct. 8, 2012.

* cited by examiner

*Primary Examiner* — Michael D Masinick
(74) *Attorney, Agent, or Firm* — Jason K. Klindtworth

(57) ABSTRACT

A control system for an electric power system is provided. The control system includes a wireless communication system for tracking one or more electric vehicles and receiving a battery charge data of said electric vehicles. The control system also includes a load sensor for sensing load of the electric power system. The control system further includes a controller for operating one or more protection elements based on the battery charge data of the electric vehicles and the load data of the electric power system.

22 Claims, 3 Drawing Sheets

CONTROL SYSTEM FOR AN ELECTRIC POWER SYSTEM

BACKGROUND

Embodiments presented herein relate generally to an electric power system and more particularly relate to devices for the electric power system.

Electric vehicles have attracted much attention recently. Electric vehicles are generally propelled by electric motors powered by a battery pack. The battery pack of an electric vehicle frequently needs to be recharged as the charge stored within the battery pack is repeatedly drawn down through normal use of the electric vehicle. Such charging and recharging of electric vehicles poses technical challenges for traditional electric power systems.

Traditional electric power systems are generally provided with protection features for protecting customers and equipment from a "fault". A fault condition may occur as a result of overly high current flowing through the electric power system resulting from a power line touching the ground. This high current may cause damage to equipment and is a potential hazard for people exposed to the fault. Electric power systems are generally provided with protection devices such as circuit breakers and reclosers, for isolating the fault condition within the electric power system. These protection devices are deployed at substations and throughout the electric power system. A circuit breaker is a switch that trips, or opens, when the device detects a high fault current transmitted through the electric power system. A recloser is essentially a programmable circuit breaker device that is used to isolate faults within an electrical power system. The operation of protection devices is based on the currents and voltages transmitted through the electric power system. If the current transmitted through the electric power system is higher than a predefined threshold limit, the protection devices may infer that a fault has occurred and may operate to isolate the fault. When a protection device isolates a fault, it means that customers downstream of the device will lose power until service is restored. The protection devices may be programmed to operate at a predefined threshold limit. Generally, the protection devices are programmed with time-current characteristics. The time-current characteristics govern the operation of the protection devices. For example, the time-current characteristics of a protection device may be designed such that a high fault current may cause the protection device to take a faster corrective measure, while a low fault current may result in slower operation of the protection device.

In normal operation, the charging of electric vehicles may draw a large current from the electric power system. Since electric vehicles are mobile, the charging of these vehicles may take place at random geographic locations and random times within the electric power system. Accordingly, a protection device with pre-programmed time-current characteristics may not be able to support the dynamic power requirements arising out of the charging of electric vehicles. For example, the charging of a large number of electric vehicles located in a specific area or zone may appear as a fault to a pre-programmed protection device. Traditional electric power systems do not distinguish between a high current due to increased load and a high current due to a fault. This may result in unnecessary power outages throughout the electric power system.

There is a need for systems which may adapt dynamically according to the power requirement from the grid.

BRIEF DESCRIPTION

A control system for an electric power system is provided. The control system includes a wireless communication system for tracking one or more electric vehicles and receiving a battery charge data of said electric vehicles. The control system also includes a load sensor for sensing load of the electric power system. The control system further includes a controller for operating one or more protection elements based on the battery charge data of the electric vehicles and the load data of the electric power system. An electric power system utilizing said control system is also provided.

In another embodiment, an electric power system is provided. The electric power system includes one or more generating stations, one or more load centers, transmission lines for transferring power from the generating station to said load centers. The electric power system further includes one or more control system. The control system includes a wireless communication system for tracking one or more electric vehicles and receiving a battery charge data of said electric vehicles. The control system also includes a load sensor for sensing a load data of the electric power system. The control system further includes a controller for operating one or more protection elements based on the battery charge data of the electric vehicles and the load data of the electric power system.

In a yet another embodiment, a method of operating a control system for an electric power system is provided. The method includes tracking one or more electric vehicles and obtaining the battery charge data of the electric vehicles. The tracking of the electric vehicles may be carried out via a wireless communication system provided in said control system. The method further includes operating one or more protection elements, based on the battery charge data of the electric vehicles and load data of the electric power system. The protection elements are operated via a controller provided in the control system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
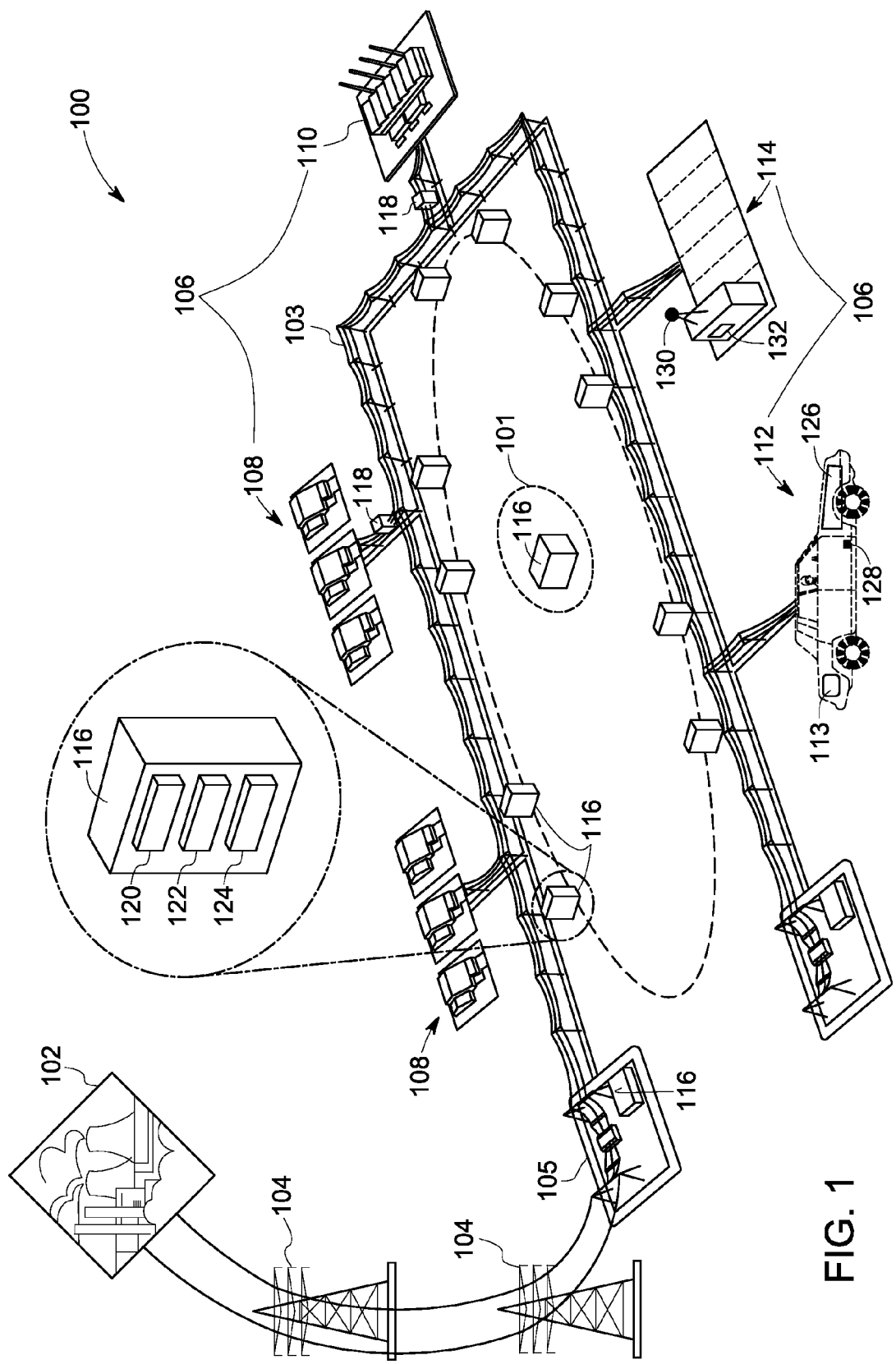
FIG. 1 illustrates a block diagram of an exemplary electric power system according to one embodiment.

Embodiments discussed herein relate to a control system of an electric power system. FIG. 1 illustrates the electric power system 100, according to one embodiment. The electric power system 100 includes a generating station 102 configured to generate power. The generating station 102 may include power generating installations such as, but not limited to a gas turbine power station, a steam turbine power station, a nuclear power station, a hydro power station, or the like. The generation station 102 may also include decentralized generation sources, renewable generation sources, and microgrid generation sources. The power generated at the generating station 102 is transmitted to distribution network 103 via the transmission lines 104. The distribution network may include transformers and distribution lines. The distribution network 103 may supply power to the load centers 106. The load centers 106 typically include domestic loads 108, and commercial loads 110. Domestic loads 110 include household loads such as domestic appliances or the like. Commercial loads 110 may include commercial establishments such as, but not limited to a factory, an office building, a hospital, an entertainment park and the like.

The load centers 106 may further include one or more electric vehicles (EVs) 112. EVs 112 are automobiles that derive power from a battery pack 113. It should be noted herein that battery pack 113 may also include super-capacitors, fuel cells, or the like. It may be noted the EVs disclosed herein may include vehicles having more than one source of power with at least one power source being an electric motor powered by a battery pack. For example, hybrid vehicles having both battery powered motors and combustion engines may be regarded as an EV. The EVs 112 are provided with one or more electric motors which provide the power to the drive shaft of the EVs 112. The battery pack 113 needs to be charged to ensure a continuous running of the EVs 112. The EVs 112 may charge the battery packs 113 at a location, provided with battery charging equipment. Such a location may be at any geographic point within the electric power system 100. In the illustrated embodiment, the EVs 112 may charge the battery packs 113 at charging stations 114. In some embodiments, the charging stations 114 may be included in the load centers 106. It may be appreciated that any location where the battery packs 113 of EVs 112 may be charged may be referred to as a charging station 114. In certain embodiments, the charging station 114 may be a domestic installation or a commercial installation.

The electric power system 100 further comprises a control system 116 for controlling the operation of the electric power system 100. The control system 116 operates the electric power system 100 in a way so as to manage the load balance in the electric power system 100. The control system 116 may incorporate subsystems such as energy management systems, distribution management systems, demand-response systems, fault detection, isolation and restoration systems that are used to measure system usage, predict future use by the loads, calculate excess power system capacity, and isolate faults. The control system 116 and its subsystems may be centrally located at a network operation center 101, de-centrally located at installations such as substations 105, or distributed throughout the power system 10 with devices such as load centers 106, for example. The control system 116 also controls the operation of one or more protection elements 118 to isolate a fault in the electric power system 100. Faults include situations of high current flowing through the electric power system 100 due to a short circuit that may result from a power line touching the ground, for example. The high current may damage electrical equipment connected to the electric power system 100 and may also be hazardous for people exposed to the fault. The control system 116 may isolate the fault by operating the protection elements 118. The protection elements 118 may include reclosers, circuit breakers and a combination of reclosers and circuit breakers.

The charging of EVs 112 can pose difficulties in the operation of conventional control systems. The charging of EVs 112 draws a considerable amount of current from the electric power system 100. Charging of EVs 112 may take place at a variety of points within the electric power system 100. Moreover, there is a possibility that a large number of EVs 112 may cluster at a particular geographic location for charging, thereby further increasing the current simultaneously drawn on the electric power system 100. Conventional control systems may construe this increased current drawn as a fault and may actuate the protection elements 118 to isolate the concerned portion of the electric power system. This may result in an unwanted power outage. In accordance with embodiments described herein, control system 116 is equipped to enable the electric power system 100 to make more informed decisions in operating the protection elements 118.

In accordance with one embodiment, the control system 116 includes a wireless communication system 120, a controller 122, and a load sensor 124. The wireless communication system 120 may be an existing communications system used by the electric power system 100, such as one for distribution automation, advanced metering infrastructure, a commercial cellular telephone network, a private radio network, or a new network built according to embodiments presented herein.

The wireless communication system 120 may track the EVs 112 via a vehicle transceiver 126, provided in the EVs 112. The wireless communication system 120 may track one or more EVs 112 which are within a transmission range of both the vehicle transceiver 126 and the wireless communication system 120. In an embodiment the wireless communication system 120 may track the EVs 112 at regular time intervals. The regular time interval may vary from 10 minutes to 60 minutes, for example. In an alternate embodiment, the wireless communication system 120 may track the EVs 112 at time intervals based on the present percentage battery charge of the EV. For example, an EV with low battery charge may be monitored frequently, while EVs which are close to fully charged may be monitored at relatively longer time intervals. In an alternate embodiment, the wireless communication system 120 may track the EVs 112 at time intervals based on the desired charging time specified by the vehicle's driver. Further, the frequency at which the EVs 112 are tracked may depend on the proximity to the wireless communication system 120 and load on the electric power system 100. The wireless communication system 120 may communicate with the vehicle transceiver 126 provided in each of the EVs 112. The EVs 112 may further have a sensor module 128 for sensing the battery charge data of the battery pack 113. The battery charge data may include percentage charge remaining in the battery pack 113, the charging rate, and charging start time. The terminal voltage of the battery may indicate the percentage charge remaining in the battery. The charging rate depends on a charging current. For example, a higher charging current indicates a higher charging rate and a lower charging current indicates a lower charging rate. The vehicle transceiver 126 may receive the battery charge data sensed by the sensor module 128 and transmit the battery charge data to the wireless communication system 120. The vehicle transceiver 126 may communicate with the wireless communication system 120 while the EV 112 is moving. Alternately, the vehicle transceiver 126 may communicate with the wireless communication system 120 while the vehicle is stationary. The wireless communication system 120 may communicate with one or more EVs 112 to obtain the percentage charge in the battery packs 113 of the EVs 112. The battery charge data may be processed by the controller 122 to decide which of the EVs 112 are most likely to charge their battery pack 113. Based on the battery charge data, the controller 122 may compute an expected load current for the electric power system 100. Thus, the controller 122 may take a more informed decision for operating the protection elements 118. In other words, the controller 122 is able to distinguish between increased current due to a fault and an increased current arising out of charging of EVs 112.

The control system 116 may estimate the expected load current on the electric power system 100. The expected load current may be estimated based on the number of EVs charging their battery pack. For example, it may be formulated that EVs with percentage battery charge lower than a threshold may need battery charging. The wireless communication system 120 may track the EVs with current percentage battery charge lower than the threshold. In an embodiment the threshold may be 20 percent. In an alternate embodiment, the threshold may vary form 10-40 percent. Once the number of EVs needing an immediate charging is known, the load current for charging these EVs may be estimated. The controller 122 may also assess if the estimated load current is within a permissible threshold. If the load current exceeds the permissible threshold, the controller 112 may suggest a lower charging current to the EVs 112. The controller 122 may further change the time-current characteristics of the protection elements 118 to accommodate the load current due to charging of the EVs 112.

The wireless communication system 120 may further communicate with a station transceiver 130 provided in the charging station 114. In one embodiment, the vehicle transceiver 126 may transmit the battery charge data of the one or more EVs 112 to the station transceiver 130. The station transceiver 130 may in turn transmit the battery charge data of the one or more EVs 112 to the wireless communication system 120. Thus, the battery charge data may either be directly communicated to the wireless communication system 120 from the vehicle transceiver 126 or may be indirectly communicated to the wireless communication system 120 via the station transceiver 130. In another embodiment, the charging station 114 may include a charge data sensor 132 which may obtain the battery charge data of the EVs 112 which are currently charging their battery packs 113 at the charging station 114. The station transceiver 130 may receive the battery charge data from the charge data sensor 132 or the vehicle transceiver 126 and transmit battery charge data to the wireless communication system 120.

The load sensor 124 is used for sensing the load data of the electric power system 100. The load sensor may include a current transformer for measuring the load current. The load sensor may further include a potential transformer for measuring a load voltage. The load data may include a load current, a load voltage, a power delivered by the electric power system 100, and a power factor. The load data may be processed by the controller 122 for balancing the load of the electric power system 100. For example, if the load data indicates that a certain portion of the electric power system 100 is already operating at or near its full load capacity, the controller 122, through the wireless communication system 120 may transmit the load data (or another signal) to the vehicle transceiver 126 and the station transceiver 130, to indicate to the charging station 114 and the EVs 112 located in the portion of the electric power system 100 to avoid battery charging in order to prevent an overload situation. Further, the controller 122 may also direct the EVs 112 to suitable charging stations 114 capable of charging the EVs 112 while still maintaining a load balance in the electric power system 100. A load balance may also be attained by maintaining the electric power system 100 at a uniform load, thereby avoiding situations wherein one portion of the electric power system 100 is disproportionately loaded with respect to other portions.

The knowledge of the load data may also facilitate the communication of a suitable charging rate to the EVs 112 and the charging stations 114. For example, a portion of the electric power system 100 under a current loading may support a low charging current, but a high charging may lead to an overload. Under such conditions, the wireless communication system 120 may communicate a suitable charging rate to the vehicle transceivers 126 and the station transceiver 130.

Figure 2:
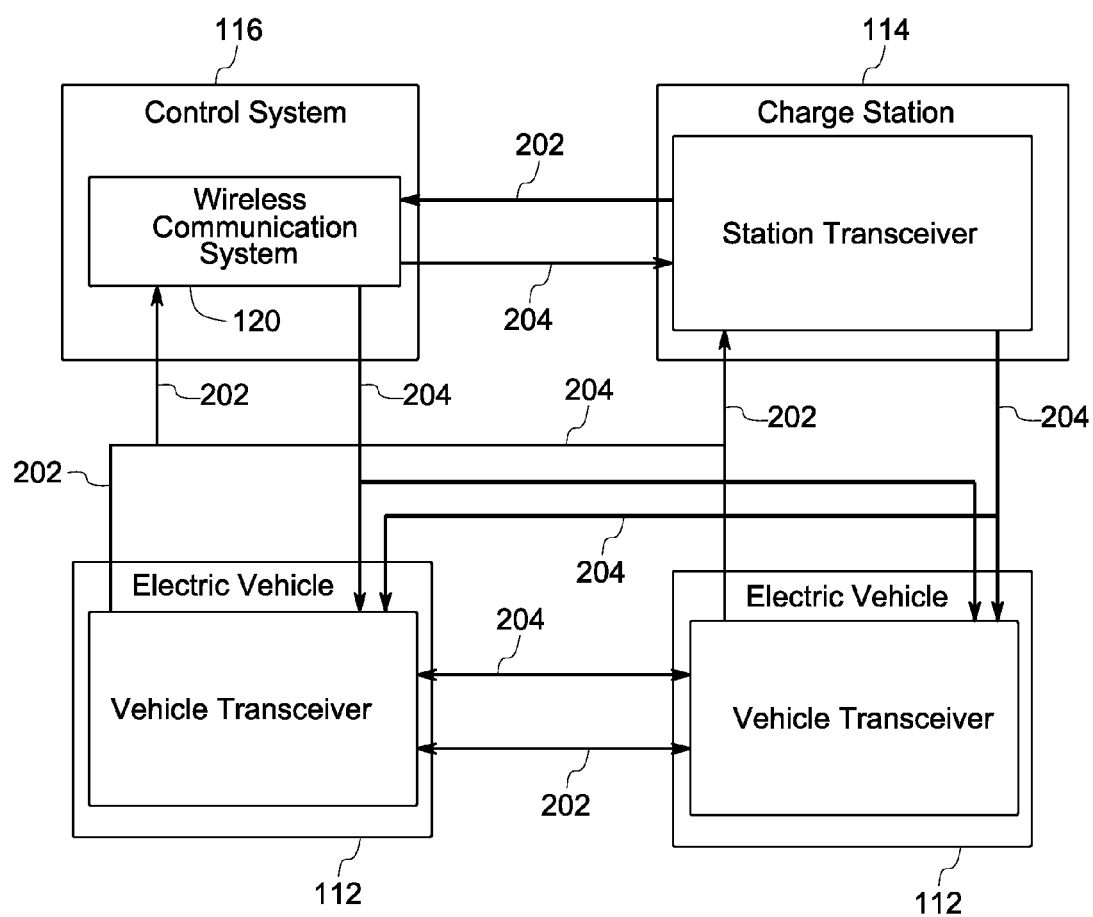
FIG. 2 is a block diagram of a data transfer schematic between an electric vehicle, a charging station and a control system for the electric power system.

The communication between the transceivers is further illustrated in FIG. 2. It may be noted that any communication between the EVs 112, charging stations 114 and the control system 116 occurs via the wireless communication system 120, vehicle transceiver 126 and the station transceiver 130. With reference to FIG. 2, EVs 112 communicate the battery charge data 202 to the charging stations 114 and the control system 116. The EVs 112 may also receive the load data 204 from the charging station 114 and the control system 116. In other words, the EVs 112 may obtain the load data 204 either directly from the control system 116 or via the charging stations 114. The charging station 114 may receive the battery charge data 202 from the EVs 112 and load data 204 from the control system 116. Further, the EVs 112 may exchange the battery charge data 202 and load data 204. In an embodiment, the EVs 112 may communicate the battery charge data to a single EV and the single EV may then relay the battery charge data of the EVs 112 to the control system 116. It may be noted that FIG. 2 is intended to be illustrative and is not intended to limit the scope of teachings presented herein. Other embodiments such may envision communication between one or more control systems. Also, communication between one or more vehicles is also envisioned. Further, one or more charging stations may also communicate between one another.

The knowledge of the battery charge data 202 may be helpful in optimizing the operation of the electric power system. For example, the battery charge data 202 of the EVs 112 may indicate if any of the EVs 112 need battery charging. The control system 116, thus may effectively estimate the expected load on the electric power system based on the cumulative battery charge data 202 of EVs 112. The knowledge of the load data 204 may be useful in determining the portions of the electric power system which are loaded up to their load limit. The control system 116 may communicate the load data 204 or load status of the power system (or portion thereof) to the EVs 112 and the charging station 114 so that the charging stations 114 and the EVs 112 may not overload the electric power system. Also, the control system 116 may communicate a suitable charging station to the EVs 112 and a suitable charging rate to the charging station 114 and the EVs 112. The suitable charging station may include a charging station located in a portion of the electric power system which is not loaded to its full capacity. In other words, a suitable charging station may include a charging station which may charge the battery pack of the EVs without over loading the electric power system. Similarly, a suitable charging rate may include a charging rate which will not overload the electric power system given the current load condition. By directing the EVs to the suitable charging station, the control system maintains a load balance in the electric power system. The control system ensures even loading of the electric power system and prevents concentration of load to a portion of the electric power system. Alternately, the charging station 114 and the EVs 112 may decide an appropriate charging rate based on the load data 204.

The control system 116, based on the load data 204 and the battery charge data 202 may further control the operation of the protection elements 118. For example, if the battery charge data 202 indicates the possibility of a large number of EVs charging their battery packs at the same time, the control system 116 may change the time-current characteristics of the protection elements 118 to adapt to a higher load current such that a fault is not detected due to the charging of the EVs. The time-current characteristic of the protection elements, particularly a circuit breaker is illustrated in FIG. 3.

Figure 3:
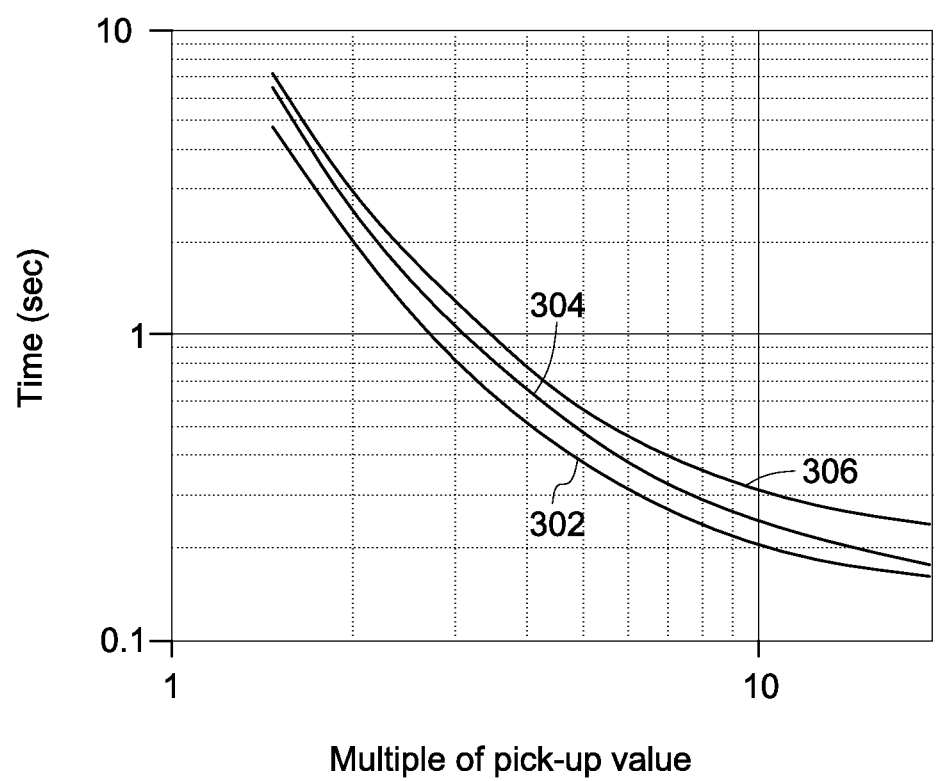
FIG. 3 illustrates plots showing time-current characteristics of a circuit breaker of the electric power system.

FIG. 3 illustrates the time-current characteristics of a circuit breaker. As mentioned earlier, the protection elements may include circuit breakers, reclosers and combinations thereof. FIG. 3 represents the load current on the X axis (in multiples of pick-up value) and time (in seconds) of operation of the protection element along the Y axis. It may be noted that FIG. 3 is a graph plotted in the logarithmic scale. A pick-up value is a threshold value of load current below which the protection element will not operate. The protection elements operate, only if the load current in the electric power system is higher than the pick-up value. The time taken for the protection element to operate is represented in Y axis. It may be observed from curve 302, that the time taken to operate the protection element depends on the value of the load current. For example, as shown in FIG. 3, the protection element operates in 2 seconds when the load current is twice the pick-up current, and the protection element operates in 0.3 seconds when the load current is 6 times the pick-up current. In other words, the higher the load current is, the faster the response is of the protection element. It may be noted that FIG. 3 illustrates a time-current characteristics of a circuit breaker, but the teachings presented herein may also be extended to the time-current characteristics of reclosers.

The charging of EVs may result in currents higher than the pick-up currents in the electric power system. In such situations, the protection elements absent the control system 116 may operate and isolate a part of the circuit. To avoid such a situation, the control system 116 may alter the time-current characteristic based on the load data and the battery charge data of the EVs. In an embodiment, the pick-up value of the protection element may be increased. In an alternate embodiment, the time-current characteristic may be shifted along the time coordinate. For example, the curve 302 may be shifted and the shifted curve may be represented by curve 304. It may be observed that curve 304 allows a higher operation time as compared to curve 302. In other words, a circuit breaker following the time-current characteristic represented by curve 304 will operate slower than a circuit breaker following the time-current characteristic represented by curve 302, the load current remaining the same. Thus, the time of operation of the circuit breaker may be altered by altering the time-current characteristics of the circuit breaker. The time-current characteristics may be chosen depending on the anticipated load current of the electric power system. For example, for high load current curve 306 may be used for governing the operation of the circuit breaker. It may be appreciated that the time of operation of the circuit breaker with a time-current characteristic represented by curve 306 will be higher than the time of operation of the circuit breaker with a time-current characteristic represented by curve 304. In other words, the time-current characteristic of the protection elements may be dynamically changed depending on the expected load current. The expected load current may be obtained based on the battery charge data of the EVs and the current load condition of the electric power system.

Embodiments presented herein are for the purpose of illustration and do not limit the scope of the teachings presented herein. For example, FIGS. 1 and 2 indicate only a single charging station and a single control system. However, systems with multiple EVs, control systems and charging stations are also envisioned. Further, the electric power system may have a plurality of control systems. Said plurality of control systems may communicate the battery charge data and the load data among one another.

The present invention has been described in terms of several embodiments solely for the purpose of illustration. Persons skilled in the art will recognize from this description that such embodiments may be practiced with modifications and alterations limited only by the spirit and scope of the appended claims.

The invention claimed is:

1. A control system comprising:
a wireless communication system configured to track one or more electric vehicles in a vicinity of a control system and to communicate battery charge data of the one or more electric vehicles and load data of an electric power system;
a controller communicatively coupled to the wireless communication system and configured to receive the battery charge data of the one or more electric vehicles and the load data of the electric power system and to determine whether to operate one or more protection elements of the electric power system by distinguishing between an increased current due to a fault and an increased current arising out of charging of one or more electric vehicles, based on the charge data of the one or more electric vehicles and the load data of the electric power system.

2. The control system of claim 1, wherein each electric vehicle comprises a vehicle transceiver configured to transmit the battery charge data of a respective one of the one or more electric vehicles to the wireless communication system and to receive the load data of the electric power system from the wireless communication system.

3. The control system of claim 1, wherein the vehicle transceiver is configured to transmit the battery charge data of the electric vehicle and the load data of the electric power system to other electric vehicles.

4. The control system of claim 1, wherein each electric vehicle comprises a sensor module configured to sense the battery charge data of the electric vehicles.

5. The control system of claim 4, wherein the battery charge data comprises at least one of a charging rate, a charging start time, and a percentage charge in a battery pack of the electric vehicles.

6. The control system of claim 1, further comprising one or more charging stations, wherein the one or more charging stations comprises a station transceiver configured to transmit the load data of the electric power system to a vehicle transceiver provided in each electric vehicle and to receive a battery charge data of the electric vehicle from the vehicle transceiver.

7. The control system of claim 6, wherein the station transceiver is configured to transmit the charge data of the electric vehicles to the wireless communication system and to receive the load data of the electric power system from the wireless communication system.

8. The control system of claim 1 further comprises one or more load sensors for sensing the load data of the electric power system.

9. The control system of claim 1, wherein the one or more charging stations comprise a plurality of battery charge data sensors for sensing at least one of a charging rate, a charging start time, and a percentage of charge in a battery pack of the electric vehicle.

10. The control system of claim 1, wherein the load data comprises at least one of a load current, a power delivered by the electric power system, a power factor, and a load voltage.

11. The control system of claim 1, wherein the wireless communication system is configured to direct the one or more electric vehicles to selected charging stations based on at least one of a current charge level of a battery pack of the one or more electric vehicles and the load data of the electric power system.

12. The control system of claim 1, wherein the wireless communication system is configured to communicate a suitable charging rate to at least one of the one or more of electric vehicles and one or more charging stations.

13. The control system of claim 1, wherein the one or more protection elements comprise one or more reclosers, one or more circuit breakers, or combinations thereof.

14. The control system of claim 1, wherein the controller is configured to change a time-current characteristic of the one or more protection elements based on at least one of the charge data of one or more electric vehicles, and the load data of the electric power system.

15. An electric power system comprising:
a power generation station;
a power transmission line for transmitting power from the power generation station to one or more load centers;
one or more control systems disposed at one or more locations in the electric power system, one or more control systems comprising:
a wireless communication system configured to track one or more electric vehicles in a vicinity of the one or more control system and to communicate a battery charge data of the one or more electric vehicles and a load data of the electric power system;
a controller communicatively coupled to the wireless communication system and configured to receive the battery charge data of the one or more electric vehicles and the load data of the electric power system and to determine whether to operate one or more protection elements of the electric power system by distinguishing between an increased current due to a fault and an increased current arising out of charging of one or more electric vehicles, based on the charge data of the one or more electric vehicles and the load data of the electric power system.

16. The electric power system of claim 15, wherein the wireless communication system is configured to direct the one or more electric vehicles to selected charging stations based on at least one of a current charge level of a battery pack of the one or more electric vehicles and the load data of the electric power system.

17. The electric power system of claim 15, wherein the wireless communication system is configured to communicate a suitable charging rate to at least one of the one or more of electric vehicles and one or more charging stations.

18. The electric power system of claim 15, wherein the one or more locations comprises a network operation center, the one or more load centers, and a substation configured to transmit power to one or more load centers.

19. A method of operating a control system for an electric power system, the method comprising
tracking one or more electric vehicles in a vicinity of the control system via a wireless communication system and obtaining a battery charge data of the one or more electric vehicles and a load data of the electric power system; and
determining whether to operate one or more protection elements of the electric power system by distinguishing between an increased current due to a fault and an increased current arising out of charging of one or more electric vehicles, based on the charge data of the one or more electric vehicles and the load data of the electric power system via a controller communicatively coupled to the wireless communication system and configured to receive the battery charge data of the one or more electric vehicles and the load data of the electric power system.

20. The method of claim 19, further comprising directing the one or more electric vehicles to selected charging stations based on at least one of a current charge level of a battery pack and the load data of the electric power system.

21. The method of claim 19, further comprising communicating a suitable charging rate to at least one of the one or more electric vehicles and the one or more charging stations based on the load data of the electric power system.

22. The method of claim 19, wherein operating the one or more protection elements comprises changing a time-current characteristic of the one or more protection elements based on at least one of the charge data of one or more electric vehicles and the load data of the electric power system.

* * * * *